June 24, 1941.    C. N. SUGDEN ET AL    2,247,102
PRESSURE RESPONSIVE GAUGE
Filed Nov. 28, 1939    2 Sheets-Sheet 1
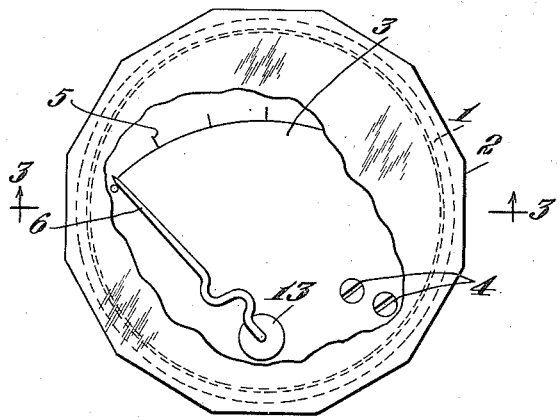
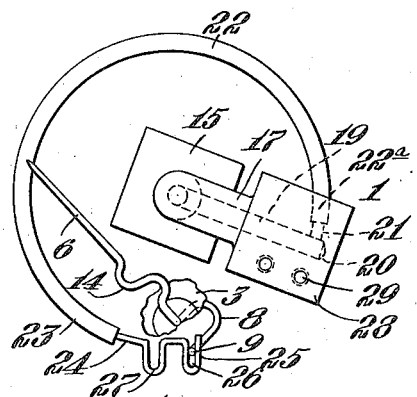
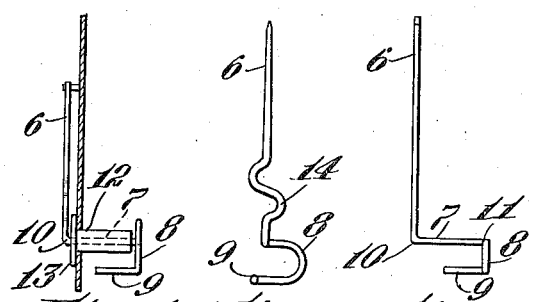
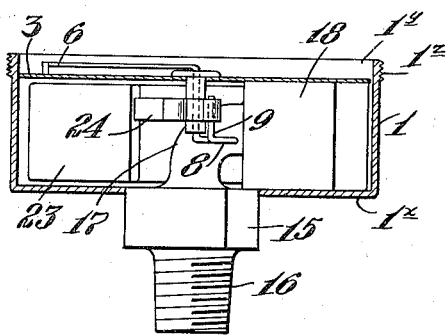
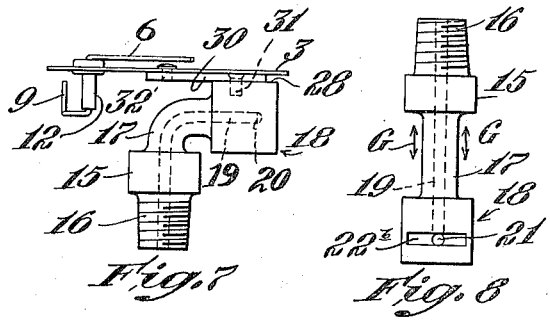
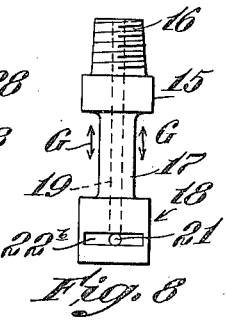
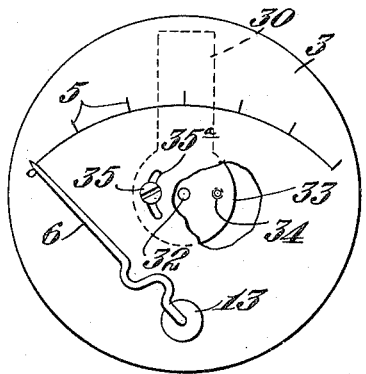
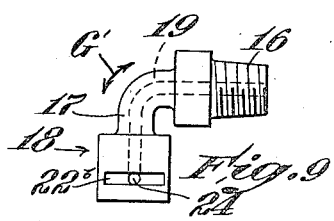
Inventors
Clifford N. Sugden
Samuel Kahn
by Roberts Cushman & Woodbury
Attys.

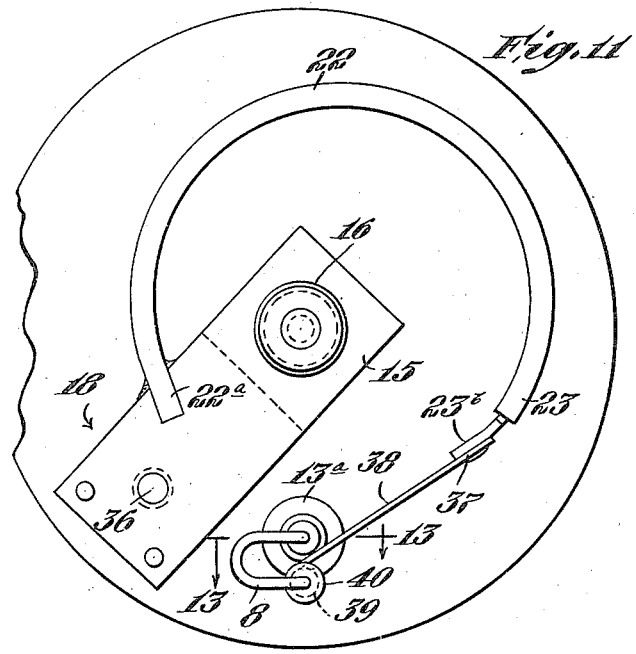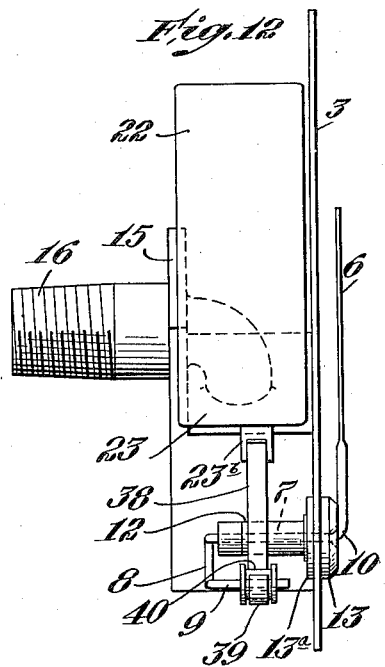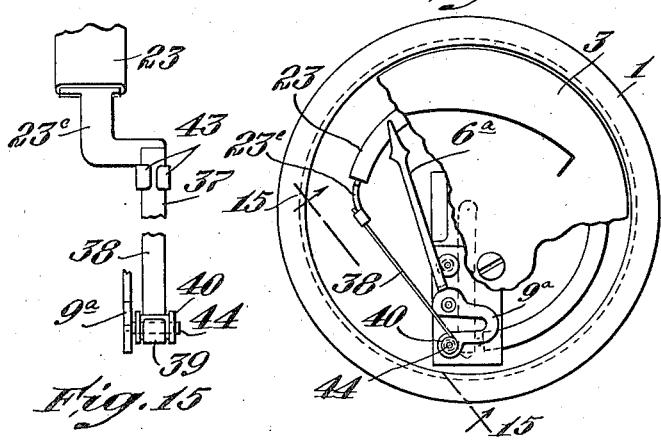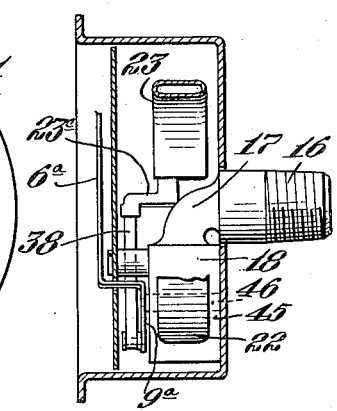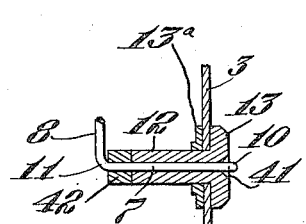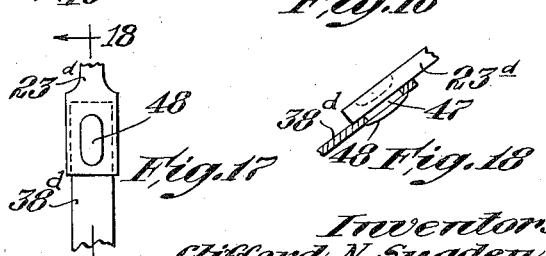

Patented June 24, 1941

2,247,102

UNITED STATES PATENT OFFICE 2,247,102

PRESSURE RESPONSIVE GAUGE

Clifford N. Sugden and Samuel Kahn, Bridgeport, Conn., assignors to Manning, Maxwell & Moore, Incorporated, New York, N. Y., a corporation of New Jersey Application November 28, 1939, Serial No. 306,474

16 Claims. (Cl. 73—189)

This invention pertains to pressure gauges or instruments of generally similar type, and relates more particularly to an instrument wherein the usual "movement" (commonly comprising a pinion meshing with a gear segment) is replaced by a simple crank and connecting rod or equivalent motion-transmitting means.

Instruments of this type are frequently used in locations where they are subject to constant and often violent vibration or where the pressure of the pressure fluid pulsates rapidly. When so employed, the constant relative motion of the moving parts of the gauge results in rapid wear of the intermeshing teeth of the pinion and segment as well as of the pinion and segment staffs and their bearings so that the accuracy of the gauge is quickly destroyed. Even when made of the cheapest materials, a gauge movement employing a pinion and gear segment is expensive to manufacture, and if, in order to insure a high degree of accuracy or to prolong the life of the gauge under adverse conditions of use, the gauge parts are made of wear-resistant material and with a high degree of precision, the resultant cost becomes prohibitive as respects gauges for many purposes.

The principal object of the present invention is to provide a gauge or similar instrument in which the motion of the pressure-sensitive element (Bourdon tube or the like) is transmitted to the index by the simplest possible connections, involving few relatively moving parts, and such that a high degree of accuracy and long life is assured even under the most trying conditions.

A further object of the invention is to provide a gauge or similar instrument which may be made at a cost substantially less than that of all known prior gauges while at the same time providing the desired accuracy and durability.

A further object of the invention is to provide a gauge or similar instrument having the simplicity of construction just referred to and yet having all necessary provision for adjustment, either for original calibration of the gauge by the manufacturer, or for correction during extended periods of operation.

Other and further objects and advantages of the invention will be pointed out hereinafter in the following more detailed description and by reference to the accompanying drawings, wherein Fig. 1 is a front elevation of a pressure gauge or similar instrument embodying the present invention showing the transparent front panel broken away so as clearly to illustrate the construction of the index device;

Fig. 2 is a front elevation of the index device and the means for actuating the latter, a small portion of the dial also being shown;

Fig. 3 is a section substantially on the line 3—3 of Fig. 1;

Fig. 4 is a fragmentary edge elevation of the assembled dial and index device;

Fig. 5 is a front elevation of the index device before its assembly with the dial;

Fig. 6 is an edge elevation of the index device shown in Fig. 5;

Fig. 7 is an elevation illustrating the fitting on which the gauge case and the dial are mounted, the case being omitted;

Fig. 8 is an elevation illustrating one useful form of fitting and being also illustrative of a second form of fitting as it appears before completion;

Fig. 9 is an elevation of a fitting having a 90° bend;

Fig. 10 is a front elevation partly broken away, illustrating the dial and its associated index device, with provision for rotary adjustment of the dial about its center;

Fig. 11 is a rear elevation of a dial partly broken away and to larger scale than that of the previous figures, showing the fitting and pressure-responsive element and a modified form of motion-transmitting means;

Fig. 12 is a side elevation of the parts shown in Fig. 11;

Fig. 13 is a fragmentary section on the line 13—13 of Fig. 11 showing details of a bearing for the index device;

Fig. 14 is a front elevation of a gauge or similar instrument of modified construction, the gauge glass being removed and the dial partly broken away to show a motion-transmitting mechanism of an alternative type;

Fig. 15 is a fragmentary section on the line 15—15 of Fig. 14;

Fig. 16 is a vertical section through the device shown in Fig. 14;

Fig. 17 is a fragmentary view generally similar to Fig. 15 but illustrating a modified construction; and Fig. 18 is a section on the line 18—18 of Fig. 17.

Referring to the drawings, the numeral 1 designates the case of a gauge or similar instrument, such case being of any suitable material, for example metal, hard rubber, synthetic resin, or the like. The case is usually more or less cylindrical in form, having the rear wall $1^x$ (Fig. 3) and being open at its front, as indicated at $1^y$ (Fig. 3) and being screw threaded at $1^z$ for the reception of the cover or cap 2. This cover or cap comprises a transparent panel through which the pointer and dial may be observed. If desired, the cap may be a unitary mass of transparent material including both the panel and the screw-threaded portion which engages the screw threads at $1^z$ on the case. Such a unitary cap or cover is more fully disclosed in the patent granted to Joseph V. Tracy No. 2,206,437, dated July 2, 1940, but it is to be understood that the present invention is not concerned with the details of construction of the case or cover.

Within the case 1 is arranged the dial 3, secured to an appropriate support, such as hereinafter described, by means of one or more screws 4 or equivalent fastening means and provided with the graduations 5 with which cooperates the pointer 6. This pointer 6 forms a part of the index device which in a preferred embodiment is illustrated in detail in Figs. 4, 5 and 6.

A preferred form of the improved index device of the present invention consists of a single length of wire shaped, for example, by bending, to provide the pointer portion 6 which is disposed to move in a plane parallel to the front face of the dial, and which may have its free extremity sharpened or otherwise finished and shaped for cooperation with the graduations 5. The index device also comprises the journal portion 7 which is disposed substantially at right angles to the pointer portion 6, and also comprises the crank portion 8 which, as illustrated, is substantially U-shaped and which lies in a plane parallel to that of the dial. The free extremity of the wire forming the crank portion is bent to form the crank or wrist pin 9 which extends forwardly from the plane of the crank portion 8 toward the back surface of the dial. In thus bending the length of wire, right angle bends are formed at the points 10 and 11 respectively.

This unitary index device is supported solely by the dial. For this purpose the dial is provided with an opening concentric with the arc along which the graduations 5 extend, and in this opening is fixed a bearing sleeve or bushing 12 preferably having a radial spacer flange 13 disposed at the front surface of the dial. The sleeve 12 with its flange 13 is fixedly secured to the dial in any desired way, for example, by solder, brazing or spot welding, the axis of the bearing bore in the bushing being perpendicular to the plane of the dial. Obviously since the index device is formed of a unitary length of wire it must be threaded through the bore in the bushing 12 before it is completed. Preferably the pointer portion 6 is provided with one or more offset bends 14 of more or less U-shape to facilitate the bending of the pointer portion if necessary for adjusting the instrument.

As illustrated in Figs. 2 and 3, the instrument is mounted on a fitting 15 which enters at the center of the back of the case, but the fitting may be designed for any other desired mounting of the instrument. This fitting 15 comprises the nipple portion 16 for connection to the fluid supply pipe, and as illustrated has the neck portion 17 of substantially less diameter than other portions of the fitting and which terminates in the head 18 which is disposed within the case and which, as illustrated in Fig. 2, is located eccentrically with respect to the center of the dial. A bore 19 extends inwardly from the nipple 16 axially through the neck 17 and into the head 18 where it terminates at the point 20, being closed at its inner end by an integral part of the metal of the head 18. A passage 21 (Fig. 2) extends laterally from the inner end of the bore 19 into a socket 22b (Fig. 8) in the side wall of the head and into which is fitted and secured one end 22a (Fig. 2) of the pressure-responsive element 22, for example a Bourdon tube having the free extremity 23 which moves in response to variations in pressure within the tubular member 22, it being understood that the latter is closed at its free extremity 23. To the movable end 23 of the pressure-responsive element is fixedly secured the connecting rod 24 which, as illustrated in Figs. 2 and 3, consists of a length of ribbon-like material, for example steel or brass, having its free end portion bent at 25 to form a U-shaped loop providing the elongate slot 26 which receives the crank pin 9 of the index device with a sliding fit. Preferably the connecting rod 24 is provided with a second U-bend 27 intermediate its ends. It is difficult, if not impossible, to fix the Bourdon tubes in place so that the tip of the tube of every gauge will be at exactly the same distance from the crank pin of the index device. Moreover, there is a desirable angular relation between the path of the tube tip and the crank which should be provided for in designing the instrument. The bend 27 facilitates calibration of the instrument and the maintenance of the proper angular relation, since it is possible, merely by spreading the legs of this bend to lengthen the connecting rod or by pressing them together, for example by the use of pliers, to shorten the connecting rod.

The front face 28 of the head 18 of the fitting is preferably flat and parallel to the plane of the dial, and is furnished with screw-threaded openings for the reception of the screws 4, whereby the dial is fixed firmly against the surface 28 of the fitting. The fitting thus carries the pressure-responsive element 22 with its attached connecting rod 24 and the dial 3, and the latter, in turn, forms the sole support for the index device comprising the pointer 6, the journal portion 7, the crank 8 and crank pin 9.

The fitting 15 is preferably made from bar stock, for example, rolled steel which, as is well known, is characterized by having the grain of the metal running longitudinally. For the intended purpose the bar stock is of such transverse dimensions as to permit the head 18 and the nipple portion 16 to be made therefrom but is turned down intermediate its ends to provide the neck portion 17, which, as above noted, is of substantially reduced diameter. The bore 19 is then drilled from the nipple end of the device but terminates within the head where it is closed by the metal of the head itself. The socket 22b and the passage 21 are formed by proper machine operations and if the fitting is to be straight, as shown in Fig. 8, no further work is necessary except that of screw threading the nipple. In most instances, however, the fitting is of angular form, as illustrated in Figs. 7 and 9, and to produce this angular fitting it is merely necessary to bend the neck portion 17 of the straight fitting shown in Fig. 8 (which may be regarded as a stage product in the manufacture of the angular fitting) through the desired angle, for example, 45° or 90°. In the neck portion 17 of the fitting the grain of the material runs substantially parallel to the axis of the neck, as indicated at G in Fig. 8, and when the neck portion is bent, as illustrated for example in Fig. 9, the grain of the material follows the arc of curvature of the neck and still remains substantially parallel to the axis of the bore 19. This mode of making the fitting not only results in lower cost of production by reason of the few number of machine operations required, but it also provides a fitting of maximum strength and permits reduction in weight by reducing the diameter of the neck 17 to a point which would not be permissible if the fitting were otherwise made.

While, as illustrated in Figs. 1, 2 and 3, the dial is fixed in position to the fitting by means of the fasteners 4, it is contemplated that the dial may be made rotatably adjustable, if desired, in order to permit setting the pointer at zero or any other desired part of the scale and without bending the pointer or crank. Thus, as shown in Fig. 7, a bracket arm 30 is secured to the face 28 of the head 18, and extends laterally to a point beneath the center of the dial. This bracket arm is attached to the head 18 by means of one or more fasteners 31, and is provided at its free extremity with a screw or pivot stud 32 which extends through a central opening in the dial. This stud 32 may be of such a nature as to permit the dial to be turned about its own axis and then fixed in position by proper manipulation of the stud, for example by tightening the stud if it be a screw stud. If preferred, some additional means may be employed for fixing the dial in its adjusted position. For example, as illustrated in Fig. 10, the bracket 30 may be provided with an enlarged head portion 33 disposed behind the center of the dial and from which the stud 32 projects. This head portion is provided with one or more screw-threaded openings 34 for the reception of screws 35 extending through arcuate slots 35a formed in the dial and concentric with the stud 32. By this means the dial may be adjusted to any desired degree for calibration or other purposes, without necessitating the bending of the pointer 4.

In Figs. 11, 12 and 13 a somewhat modified construction is illustrated wherein parts similar to those previously described are designated by the same reference characters. In this modified arrangement the movable extremity 23 of the pressure-responsive element is furnished with a lug 23b fixedly secured thereto and to which is secured one end 37 of the connecting rod 38. In this instance the connecting rod consists of a length of yieldably resilient material, for example clock spring steel or the like, and is shaped at its free end to provide an encircling loop or spring clip 39 which closely embraces and holds a spool-like bearing sleeve 40 having an axial bearing opening which receives the crank pin 9 of the index device. This construction permits the use of a complete bearing for the crank pin 9 instead of the open slot 26 of the construction shown in Fig. 2. However, in order to permit of the use of such a complete bearing as the bushing 40, it is necessary that there be some possibility of yielding of the parts between the pin 9 and the extremity 23 of the Bourdon tube, and such yielding is provided by the use of the resilient and flexible connecting rod 38.

In the construction shown in Figs. 11, 12 and 13, the bearing bore of the bushing 12 is counter-sunk at its forward end at 41. This is to prevent the curving material of the index device at the inner side of the bend 10 from binding at the forward end of the bearing bore. To prevent binding at the bend 11 where the crank portion 8 joins the journal portion 7, a freely rotatable collar 42 is provided. This collar is mounted on the journal portion 7 adjacent to the rear end of the bushing 12. Thus, if in bending the crank 8 with respect to the journal 7, the material forming the bend should bind upon the collar 42, nevertheless there is no interference with the free turning of the index device, since the collar 42 is free to turn relatively to the bushing 12.

In Figs. 14, 15 and 16 certain further modifications are illustrated. Thus as most clearly indicated in Fig. 15, the end 37 of the flexible and resilient connecting rod 38 is secured to a lug 23c fixed to the end 23 of the member 22 by means of ears or clips 43 integral with the part 23c and which are turned up and over the end 37. These ears 43 permit slight longitudinal adjustment of the part 37 with respect to the part 23c, although normally holding the end of the connecting rod securely with reference to the moving end 23 of the Bourdon tube. If desired these ears 43 may be so spaced initially from the body of the part 23c as to permit free longitudinal movement of the part 37 and after adjustment may then be pressed down tightly or spot welded to the part 37 so as to prevent further adjustment.

In the construction shown in Figs. 14, 15 and 16, the index device, instead of being made from a length of wire, is a stamping comprising the pointer portion 6a and the offset crank portion 9a, the latter being more or less U-shaped (Fig. 14) and having a crank pin 44 fixed to and projecting forwardly from its free extremity. This crank pin passes through a bearing bushing 40 like that previously referred to, and which is secured to the connecting rod 38 by the encircling clip portion 39 of the latter. In this instance the head 18 is furnished with a bore 45 (Fig. 16) whose axis is perpendicular to the plane of the dial. A pivot member or staff 46 is fixedly secured to the stamping which forms the pointer 6a and the crank member 9a. This pivot or staff constitutes a part of the index device and is arranged to turn in the bore 45. Since the connecting rod 38 is substantially rigid in a front-to-rear direction, and since the bearing bushing 40 is disposed at the forward side of the U-shaped crank member 9a, it is impossible for the staff 46 to escape from the bearing or socket 45 after the parts are assembled.

In Figs. 17 and 18 a further modified arrangement for securing the connecting rod to the moving tip 23 of the Bourdon tube is illustrated. In this arrangement a lug 23d is fixedly secured to the tip 23, such lug being of sheet material and having an elongate stud 47 projecting from its face. Preferably this stud is formed by a punching operation by which the metal of the part 23d is extruded. The end 38d of the connecting rod is furnished with an elongate slot which fits over the stud 47, the latter projecting beyond the face of the part 38d and being peened over at 48 so as to provide a riveted, rigid connection between the parts.

It will be appreciated that the construction hereinabove described provides a gauge having but few moving parts, the index device being of unitary character and the motion-transmitting means for transmitting motion from the tip 23 of the pressure-responsive element to the pointer being reduced to the simplest construction, to wit, a crank and connecting rod. Since even these few parts are so devised that they may be made from simple material of substantially standard commercial forms, it is evident that the entire mechanism of the gauge can be produced very cheaply. However, this cheapness of construction is not obtained at the sacrifice of accuracy nor of capability for calibration or adjustment, and in fact results in a gauge having more than usual accuracy for an instrument of its particular price class, and which does not rapidly deteriorate when subjected to difficult conditions in use, for example, to excessive vibration. The construction is very light and since the parts are small and simple it is readily possible to make gauges of very small size without recourse to the precision machine work necessary in making small gauges having gauge movements of the ordinary type.

While certain desirable arrangements and embodiments of the present invention have herein been illustrated, it is to be understood that the invention is not necessarily limited to the precise details herein shown, but is to be regarded as broadly inclusive of any and all equivalents either of material, construction or relative arrangement of parts such as fall within the terms of the appended claims.

We claim:

1. An instrument of the kind which includes a pressure-responsive element having a movable part which varies its position in response to pressure fluctuations, an index device comprising a pointer, a dial for cooperation with the pointer, a fixed support and means for transmitting movement from said movable part of the pressure-responsive element to the index device, characterized in having a bearing bushing mounted in an aperture in the dial, said aperture being eccentric with respect to the center of the dial, the index device including a journal portion which turns in said bearing bushing, and in having pivot means connecting the dial to the support thereby to permit angular adjustment of the dial in its own plane relative to the support, and means for holding the dial in adjusted position.

2. An instrument of the kind having a case which houses the moving parts, and a fitting to which the case is secured and which has an inlet bore leading from the exterior to the interior of the case, and a hollow pressure-responsive element having one end secured to the fitting within the case and whose interior is in communication with the bore in the fitting, said pressure-responsive element having a free end which moves in response to internal pressure fluctuations, a graduated dial, means for adjustably securing the dial to the fitting, an index device including a pointer, and means for transmitting motion from the free end of the pressure-responsive element to the index device, characterized in that the dial has a bearing constituting the sole support for the index device and in that the fitting constitutes the sole support for the dial, the means for securing the dial to the fitting being so designed and arranged as to permit movement of the dial thereby to adjust the index device with reference to the graduations on the dial.

3. An instrument of the kind which includes a pressure-responsive element having a movable part which varies its position in response to pressure fluctuations, an index device comprising a pointer, a dial for cooperation with the pointer, and means for transmitting movement from said movable part of the pressure-responsive element to the index device, characterized in that the index device comprises a length of bent wire having a pointer portion, a journal portion, and a crank portion, a bearing bushing fixed in the dial and in which the journal portion of the index device turns, the bearing opening in said bushing being counter-bored at its forward end to accommodate the angular bend uniting the journal and pointer portions of the index device, and a freely rotatable collar turning on the journal portion of the index device and interposed between the rear end of the bearing bushing and the angular bend which unites the journal and crank portions of the index device.

4. An instrument of the kind having a casing which houses the moving parts, and a fitting to which the case is secured and a pressure-responsive element secured to the fitting, said pressure-responsive element having a free end which moves in response to internal pressure fluctuations, a dial, an index device including a pointer and a journal portion, and means for transmitting motion from the free end of the pressure-responsive element to the index device, characterized in that the fitting has a surface which is substantially parallel to the plane of movement of the pointer, pivot means securing the dial to said surface of the fitting thereby to permit rotary adjustment of the dial, and bearing means carried by the dial in which the journal portion of the index device turns.

5. An instrument of the kind which includes a pressure-responsive element having a movable part which varies its position in response to pressure fluctuations, an index device comprising a pointer, a dial for cooperation with the pointer, and means for transmitting movement from said movable part of the pressure-responsive element to the index device, characterized in having pivot means for the dial located substantially centrally of the gauge case, means for securing the dial in selected position of rotary adjustment about said pivot as a center, and bearing means for the index device mounted on the dial at a point eccentric to said pivot.

6. An instrument of the kind having a casing which houses the moving parts, and a fitting to which the case is secured, and a pressure-responsive element secured to the fitting, said pressure-responsive element having a free end which moves in response to internal pressure fluctuations, a dial, an index device including a pointer, and means for transmitting motion from the free end of the pressure-responsive element to the index device, characterized in that the fitting has a part within the case which is located eccentrically with respect to the center of the dial and to which the fixed end of the pressure-responsive element is secured, a fixed bracket also secured to said part of the fitting, said bracket extending to a point behind the central portion of the dial, pivot means at the center of the dial securing the latter to the bracket, and a bearing carried by the dial eccentrically located with respect to said pivot means, and in which a journal portion of the index device turns.

7. An instrument of the kind which includes a Bourdon tube whose tip varies its position in response to pressure fluctuations, an index device comprising a pointer, a dial for cooperation with the pointer, the index device consisting of a single length of wire bent to provide a pointer portion, a journal portion and a crank pin portion, and a connecting rod operative to transmit motion from the tip of the Bourdon tube to the crank-pin portion of the index device, characterized in that said connecting rod consists of a single length of metal ribbon having its wider faces substantially perpendicular to the plane of the dial, one end of said rod being normally fixedly connected to the tip of the Bourdon tube and the other end of the rod carrying a bearing for the journal portion of the index device.

8. An instrument of the kind which includes a Bourdon tube having a movable tip which varies its position in response to pressure fluctuations, an index device comprising a pointer, a dial for cooperation with the pointer, a connecting rod for transmitting movement from the tip of the Bourdon tube to the index device, the index device comprising a single length of wire having a pointer portion disposed substantially parallel to the front face of the dial, a journal portion substantially perpendicular to the plane of the dial and which extends through an opening in the dial and a U-shaped crank portion substantially parallel to the rear face of the dial and which has a crank pin at its free end extending substantially perpendicular to the plane of the dial, characterized in that the connecting rod consists of a single length of metal ribbon one end of which is normally rigidly united to the tip of the Bourdon tube and the opposite end of which carries a bearing bushing in which the crank-pin portion of the index device is journaled, the connecting rod having its wider faces perpendicular to the plane of the dial thereby accurately positioning the axis of said bushing so that at all positions of the crank pin the axis of the bushing is perpendicular to the plane of the dial.

9. An instrument of the kind which includes a pressure-responsive element having a movable part which varies its position in response to pressure fluctuations, an index device comprising a pointer and a dial for cooperation with the pointer, the index device also comprising a crank pin rigidly fixed relatively to the pointer, and a one-piece connecting rod normally fixed at one end to the moving part of the pressure-responsive element, said connecting rod being a length of metal ribbon having its wide faces substantially perpendicular to the plane of the dial, and bearing means supported by the opposite end of the connecting rod in which the crank pin turns, characterized in that the connection between said rod and said movable part is so devised and arranged as to permit longitudinal adjustment of the rod relatively to said part.

10. An instrument of the kind which includes a pressure-responsive element having a movable part which varies its position in respect to pressure fluctuations, an index device comprising a pointer and a dial for cooperation with the pointer, the index device also comprising a crank pin rigidly fixed relatively to the pointer, and a connecting rod for transmitting movement from said movable part to the crank pin, characterized in that said connecting rod consists of a length of resilient metal ribbon, one end of which is normally fixedly secured to said moving part and the opposite end of which is bent to form a resilient clip which supports a bearing bushing in which the crank pin turns.

11. An instrument of the kind which includes a Bourdon tube whose tube varies its position in respect to pressure fluctuations, an index device comprising a pointer and a dial for cooperation with the pointer, the index device comprising a crank pin rigidly fixed relative to the pointer and a connecting rod normally rigidly secured at one end to the tip of the Bourdon tube, said rod consisting of a length of flexible resilient metal ribbon, characterized in that the connection between said rod and the tip of the tube is so devised and arranged as to permit longitudinal adjustment of the rod relatively to said tip and in having a bearing secured to the opposite end of the resilient connecting rod in which the crank pin is journaled.

12. An instrument of the kind which includes a Bourdon tube having a movable tip which varies its position in response to pressure fluctuations, an index device comprising a pointer and a dial for cooperation with the pointer, the index device comprising a crank pin rigidly fixed relatively to the pointer and a connecting rod for transmitting motion from the tip of the tube to the crank pin, characterized in that said connecting rod is resiliently flexible and has one end which overlaps the tip portion of the tube and means uniting the overlapping parts of the rod and the tip portion of the tube, the other end of the connecting rod supporting bearing means in which the crank pin is journaled.

13. An instrument of the kind which includes a pressure-responsive element having a movable part which varies its position in response to pressure fluctuations, an index device comprising a pointer and a dial for cooperation with the pointer, the index device comprising a crank pin rigidly fixed relatively to the pointer, and a connecting rod for transmitting motion from said movable part to the crank pin, characterized in that said connecting rod is a unitary length of flexible metal ribbon one end of which has an elongate aperture, the moving part of the pressure-responsive element having an integral elongate boss which fits within said aperture and which is headed over to form a riveted union between the rod and said part, the rod having bearing means adjacent to its opposite end for the reception of the crank pin.

14. An instrument of the class described comprising a pressure-motor device having a movable actuating part, a dial, a pivot about which the dial may be adjustably rotated, a bearing bushing carried by the dial eccentric to the pivot of the dial, a shaft arranged to turn in said bearing bushing, a pointer secured to said shaft, a lever also secured to the shaft, and means for transmitting motion for the movable actuating part of the motor device to said lever, the arrangement of the dial, shaft and motion-transmitting means being such that after assembly of the parts the pointer may be set at the zero of the scale without bending the pointer or other parts.

15. In an instrument of the class described in combination, a pressure-motor device, a dial, a pivot about which the dial may turn, means operative to fix the dial in adjusted position about its pivot, a bearing bushing secured in an aperture in the dial with its axis parallel with but eccentric to the dial pivot, a shaft arranged to turn in the bushing, a pointer secured to the shaft and means for transmitting motion from the motor device to the shaft thereby to turn a pointer, the arrangement of the dial, shaft and motion-transmitting means being such that the instrument may be calibrated by turning the dial.

16. In an instrument of the class described in combination, a pressure-motor device, a dial, a pointer supported by the dial, motion-transmitting means for transmitting motion from the motor device to the pointer, and means supporting the dial for movement of adjustment in its own plane about a center spaced from the axis of the pointer,—the dial, pointer and motion-transmitting means being so constructed and arranged that the instrument may be calibrated solely by such movement of adjustment of the dial.

CLIFFORD N. SUGDEN.
SAMUEL KAHN.